United States Patent [19]

Desgrousilliers et al.

[11] Patent Number: 5,812,436
[45] Date of Patent: Sep. 22, 1998

[54] METHOD AND APPARATUS FOR TESTING AND ANALYZING THE CONFORMANCE OF A PROPOSED SET OF REQUIREMENTS FOR A PROPOSED NETWORK MANAGEMENT APPLICATION

[75] Inventors: Marc Desgrousilliers, Campbell; Gregory H. Henderson, Los Gatos; Jane S. Prugsanapan, San Jose, all of Calif.

[73] Assignee: Tandem Computers Incorporated, Cupertino, Calif.

[21] Appl. No.: 326,771

[22] Filed: Oct. 20, 1994

[51] Int. Cl.⁶ .......................................... G06F 9/455
[52] U.S. Cl. .............................. 364/580; 395/701
[58] Field of Search ........................ 364/972.2, 972.3, 364/274.2, 274.3, 274.5, 274.7, 580, 282.1, 242.94, 267, 286, 191, 192, 944.9, 267.4, 578, 242.95, 242.96, 264.3, 972, 274.1; 395/50, 10, 922, 700, 183.01, 62, 701

[56] References Cited

U.S. PATENT DOCUMENTS

| | | | |
|---|---|---|---|
| 5,159,687 | 10/1992 | Richburg | 395/700 |
| 5,269,014 | 12/1993 | Ogino | 395/500 |
| 5,337,320 | 8/1994 | Kung | 371/15.1 |
| 5,418,793 | 5/1995 | Chang et al. | 371/27 |
| 5,475,843 | 12/1995 | Halviatti et al. | 395/700 |
| 5,490,249 | 2/1996 | Miller | 395/183.14 |
| 5,526,522 | 6/1996 | Takeuchi | 395/700 |

OTHER PUBLICATIONS

Miyazaki, et al., "Fujitsu Limited, Fujitsu Laboratories", Kawasaki 211, Japan, pp. 1–5.

*Primary Examiner*—Emanuel T. Voeltz
*Assistant Examiner*—Tony M. Cole
*Attorney, Agent, or Firm*—Graham & James

[57] ABSTRACT

A method and system for preparing a suite of test scripts for testing a proposed network management application. The proposed network management application, termed a subsystem control facility (SCF), is first defined as a set of requirements with the aid of a developmental tool incorporating a subsystem knowledgebase and a test generation knowledgebase. The subsystem knowledgebase contains the rules governing the operation of a given network and a library of permitted commands, objects, attributes, modifiers and other data. The test generation knowledgebase includes information relating to those commands and object specific to the proposed subsystem control facility set of requirements. A user interface coupled to the knowledgebases permits the selection of types of tests and specific commands and objects to be tested. Once test selection has been specified, test scripts corresponding to the selected tests are generated from the first and second knowledgebases for use in testing the proposed set of requirements for the SCF prior to coding the SCF. The suite of test scripts can be used to test the proposed SCF set of requirements, detect nonconformance with the rules and permit modification of the proposed set of SCF requirements. If necessary, additional testing may be performed using the same test scripts or a subset thereof, until the test results indicate no errors and a minimum number of warnings. Thereafter, the SCF product module can be coded. Errors in the developmental stage can be thus corrected early in the developmental cycle.

25 Claims, 8 Drawing Sheets

Microfiche Appendix Included
(17 Microfiche, 1658 Pages)

METHOD AND APPARATUS FOR TESTING AND ANALYZING THE CONFORMANCE OF A PROPOSED SET OF REQUIREMENTS FOR A PROPOSED NETWORK MANAGEMENT APPLICATION

CROSS-REFERENCE TO RELATED APPLICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

This application contains common subject matter to the invention disclosed in U.S. patent application Ser. No. 08/350,230 filed of even date herewith entitled "Method And Apparatus For Preparing a Suite of Test Scripts for Testing a Proposed Network Management Application".

Microfiche appendix. Number of microfiche pages is 17 and 1658 frames.

BACKGROUND OF THE INVENTION

This invention relates to network management applications in general, and to distributed systems management applications in particular.

Network management applications are known in which a large relatively complex network of processors and network objects are linked together to permit the flow of data between processors and objects in an orderly fashion. Typically, such systems are designed to permit the flow of not only data intrinsic to the operation of an object (e.g. the user ID number and amount and date of a transaction in an ATM machine) but also information relating to the operational past history and present status of the objects incorporated into the network design (e.g. whether a communication line has been started, is stopped, or is absent from a network node). In order to afford wide flexibility to systems of this type, such as the ability to add on more objects to the network—either singly or in an hierarchical array—or to substitute objects having more desirable operational characteristics than existing objects, such as adding new revisions or upgrades, such systems typically include a standard programmatic interface for each subsystem associated to the network, as well as a subsystem control facility providing a user interface to the network, with each subsystem control facility having its own associated collection of objects. The subsystem programmatic interface is designed to ensure compatibility at a programmatic level, while the subsystem control facility is designed to provide compatibility at the graphical interface level. The subsystem programmatic interface must adhere to preexisting preselected rules governing the transfer of information over the network; while the subsystem control facility must adhere to syntax standards preestablished for a given network. In addition, the protocol rules and the syntax rules must be flexible enough to accommodate a wide range of potential objects and attributes.

When designing a new subsystem control facility, the process typically involves a software designer who prepares a proposed engineering specification and a proposed programmatic interface specification which together represent a set of requirements for the proposed subsystem control facility. Once completed, both of these specifications must be reviewed by experts to ensure compliance with the system rules and standards. Each specification requires different and distinct expertise: a quality assurance expert for the external specification and a programmatic interface expert for the programmatic interface specification having detailed knowledge of the programmatic interface rules and constraints. Frequently, during review of the specifications, the designer will change the proposed set of requirements in such a way as to render invalid or incomplete the review being currently performed by the quality assurance and programmatic interface experts.

After the experts have completed their reviews and suggested changes (if any) have been made by the subsystem control facility designer, the designer then implements the set of requirements by creating actual program code, usually with the assistance of support programs. After implementation is completed in actual code form, the software developer must test the code by creating a series of realistic test exercises to verify correct operation of the requirements and the logic design in both a positive sense (i.e., the proposed subsystem control facility adequately performs the desired functions with valid data) and negatively (i.e., the proposed subsystem control facility will refuse to perform non-supported functions, will not accept invalid data, and will report appropriate error messages).

With complex systems having many operational rules (e.g. on the order of 600 or more) and a relatively complex subsystem programmatic interface, as well as a wide variety of choices of commands, object types and attributes, the subsystem control facility development cycle is necessarily much longer than desired, due to the requirement that the subsystem developer become intrinsically familiar with these network requirements, a process which can take up to two months before the developer has reached the stage at which the generation of the specifications can begin. Further, the expertise required to review both types of specification and spot errors in the proposed set of requirements is so difficult to develop that experts in either or both areas are not readily available to perform the requisite review. As a consequence, review is delayed, adding more time to the development cycle. In addition, the longer the review period, the more likely the original proposed set of requirements will have been changed by the developer, which extends the review cycle even further and impairs the efficacy of the review process.

Further, errors are frequently incorporated into a new proposed set of requirements which only become evident after the set of requirements has been exercised by comprehensive testing and analysis of the testing results. Due to the need to create custom tailored tests for each new proposed subsystem control facility design, the onset of the testing process is similarly delayed. Perhaps more importantly, however, if the results of the test reveal design defects in the programming code, this code must be revised so as to eliminate the cause for the improper performance, which adds further delay to the development process.

A knowledgebase design tool which addresses the difficulties and delays inherent with the subsystem control facility developmental process has been developed, which permits a subsystem developer to reliably design a new subsystem control facility using a graphical interface with a knowledgebase. This design tool is described in Appendix A attached hereto in microfiche form, the disclosure of which is hereby incorporated by reference. In this design tool, the subsystem designer is able to call up and examine in an orderly manner all of the specific commands and objects to be incorporated into the specific proposed subsystem set of requirements, from a generic set of permitted commands and objects. In addition, the subsystem designer is able to select appropriate error messages, and help and error texts, for display purposes. By individual selection using the interface keys and guided by the interface prompts, the subsystem designer can construct the proposed set of requirements. Improper selections by the developer are noted on the screen of the graphics interface, thereby enabling the developer to correct syntactical errors and rules errors throughout the design process. Once the developer has completed the initial set of requirements, the knowledgebase system then generates an appropriate external specification in text form which can be reviewed for compliance with the system rules and standards by the quality assurance and programmatic interface experts. In addition, the knowledgebase system also generates a set of help/error text files tailored to the specific commands and objects of the new set of requirements, a data dictionary language tailored also to the set of requirements and a binary table file which contains in binary form the command syntax, display format and programmatic interface buffer formatting information needed to match the new subsystem design.

SUMMARY OF THE INVENTION

The invention comprises a method and system employing the above described developmental tool for providing automatic test generation and analysis after the developer has completed the set of requirements, which permits comprehensive testing of both positive and negative performance of the new set of requirements and which permits a new proposed subsystem control facility to be tested thoroughly and the testing results analyzed prior to implementation in code form. The analyzed test results include traceability to the requirements as expressed in the developmental tool knowledgebase.

From a process standpoint, the invention comprises a method of testing and analyzing the conformance of a proposed set of requirements for a proposed subsystem control facility for a distributed systems network, the method including the steps of providing a knowledgebase containing a predetermined set of subsystem requirements, preparing a proposed set of requirements for a proposed subsystem control facility expressed in binary table form, providing a suite of test scripts for testing the proposed set of requirements against the predetermined set of subsystem requirements, applying the binary table and the suite of test scripts to a test subsystem control facility to generate test results, and analyzing the test results using the predetermined set of subsystem requirements to measure the conformance of the proposed set of requirements to the predetermined set of subsystem requirements. The predetermined set of subsystem requirements includes rules governing the operation of a subject network and a library of permitted commands and objects, and the proposed set of requirements includes paired selections of commands and objects from the library, and the step of analyzing includes the steps of comparing the test results obtained using the paired selections of commands and objects with the rules and specifying violations thereof. The library further preferably includes object modifiers and attributes, and the proposed set of requirements preferably includes selected modifiers and attributes paired to objects, and the step of analyzing includes the steps of comparing the test results obtained using the selected modifiers and attributes paired to objects with the rules and specifying violations of the rules.

The test scripts preferably implement positive tests for testing the ability of the proposed subsystem control facility set of requirements to process valid commands and objects and negative tests for testing the ability of the proposed set of requirements to process invalid commands or objects, and the step of analyzing includes the step of recording any failure to conform with the positive tests or the negative tests.

The step of analyzing further includes the steps of specifying the nature or any nonconformance, indicating the correction required to establish nonconformance, and relating the nonconformance to the predetermined set of subsystem requirements.

The step of providing a suite of test scripts includes the steps of providing a second knowledgebase containing test generation information relating to those commands and objects specific to the proposed subsystem control facility set of requirements, providing a user interface permitting selection of types of tests and specific commands and objects to be tested, and using the first and second knowledgebases to generate the suite of test scripts. The step of providing a second knowledgebase preferably includes the step of furnishing test generation information including a common and minimal set of test techniques to be applied to the proposed subsystem control facility set of requirements. The common minimal set of test techniques includes positive tests for testing the ability of the proposed subsystem control facility set of requirements to process valid commands and objects and negative tests for testing the ability of the proposed set of requirements to process invalid commands or objects.

The step of providing a knowledgebase includes the step of furnishing a global set of object types, object names, permitted object attributes and permitted object values. The step of providing a suite of test scripts includes the step of generating a plurality of test scripts files and corresponding template files.

From an apparatus standpoint, the invention comprises a system for testing and analyzing the conformance of a proposed set of requirements for a proposed subsystem control facility for a distributed systems network, the system comprising means for providing a knowledgebase containing a predetermined set of subsystem requirements, means for preparing a proposed set of requirements for a proposed subsystem control facility expressed in binary table form, means for providing a suite of test scripts for testing the proposed set of requirements against the predetermined set of subsystem requirements, means for applying the binary table and the suite of test scripts to a test subsystem control facility to generate test results, and means for analyzing the test results using the predetermined set of subsystem requirements to measure the conformance of the proposed set of requirements to the predetermined set of subsystem requirements. The predetermined set of subsystem requirements includes rules governing the operation of a subject network in a library of permitted commands and objects, the proposed set of requirements includes paired selections of commands and objects from the library, and the means for analyzing includes means for comparing the test results obtained using the paired selections of commands and objects with the rules and specifying violations thereof. The library further includes object modifiers and attributes, the proposed set of requirements includes selected modifiers and attributes paired to objects, and the means for analyzing includes means for comparing the test results obtained using the selected modifiers and attributes paired to objects with the rules and specifying violations of the rules.

The test scripts implement positive tests for testing the ability of the proposed subsystem control facility set of requirements to process valid commands and objects and negative tests for testing the ability of the proposed set of requirements to process invalid commands or objects, and the means for analyzing includes means for reporting any failure to conform with the positive tests or the negative tests.

The means for analyzing further includes means for specifying the nature of any nonconformance, means for indicating the correction required to establish nonconformance, and means for relating the nonconformance to the predetermined set of subsystem requirements.

The means for providing a suite of test scripts includes means for providing a second knowledgebase containing test generation information relating to those commands and objects specific to the proposed subsystem control facility set of requirements, means for providing a user interface permitting selection of types of tests and specific commands and objects to be tested, and means for using the first and second knowledgebases to generate the suite of test scripts. The means for providing a second knowledgebase further includes means for furnishing test generation information including a common and minimal set of test techniques to be applied to the proposed subsystem control facility set of requirements. The common minimal set of test techniques includes positive tests for testing the ability of the proposed subsystem control facility set of requirements to process valid commands and objects and negative tests for testing the ability of the set of requirements to process invalid commands or objects.

The means for providing a knowledgebase includes means for furnishing a global set of object types, object names, permitted object attributes and permitted object values. The means for providing a suite of test scripts includes means for generating a plurality of test scripts files and corresponding template files.

The invention implements a requirements testing in which the common and minimal set of required test techniques is applied to the proposed set of requirements, and the results are analyzed in such a manner as to provide the user with traceability to the predetermined set of subsystem requirement: viz. where a defect may have occurred, the nature of the defect, the correct value and a simple statement of the defect conclusion or a reference to that portion of the knowledgebase containing the pertinent rules. Most importantly, by revealing defects in the proposed set of requirements prior to implementation of the proposed subsystem control facility by coding, sources of errors can be remedied before extensive efforts have commenced in preparing the actual program code, which eliminates propagation of such errors into the code and the attendant difficulty in undoing such propagated errors.

For a fuller understanding of the nature and advantages of the invention, reference should be had to the ensuing detailed description taken in conjunction with the accompanying drawings.

DETAILED DESCRIPTION OF THE PREFERRED EMBODIMENT

Figure 1:
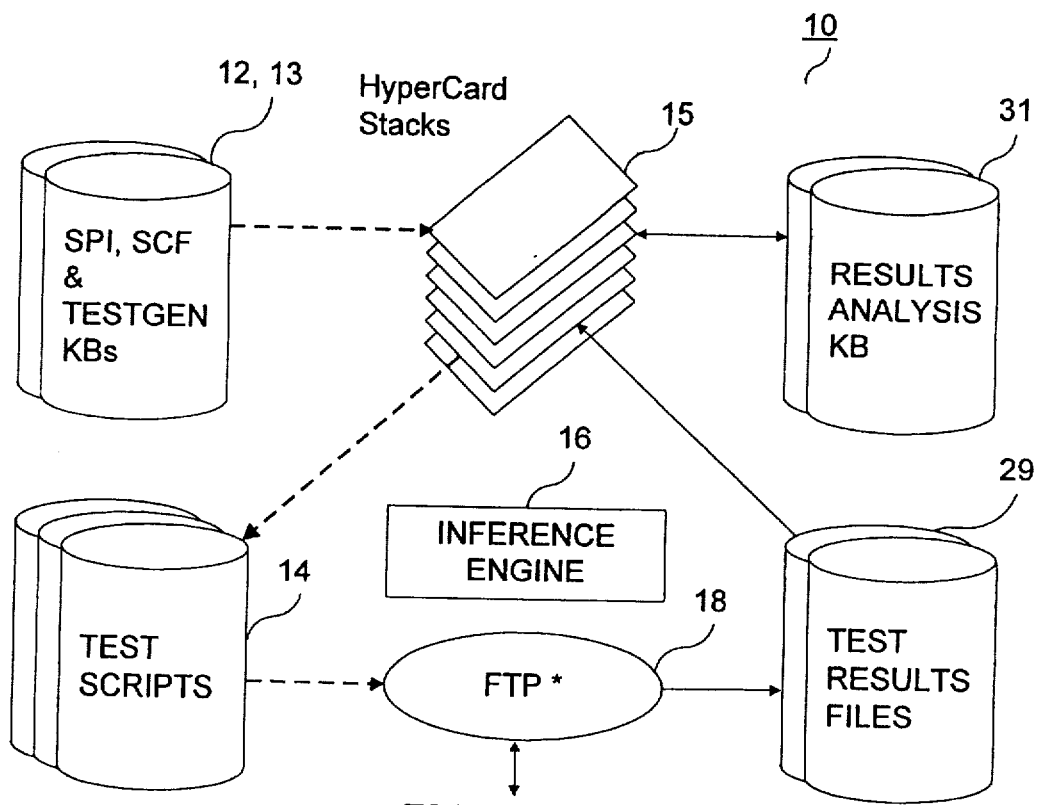
FIG. 1 is a block diagram illustrating a knowledgebase system for generating a suite of test scripts.

Turning now to the drawings, FIG. 1 illustrates a knowledgebase developmental system 10 used to generate test scripts for use in testing a proposed subsystem control facility set of requirements prior to preparing actual software code for implementing the subsystem control facility. As seen in this figure, the knowledgebase includes a plurality of knowledgebase file storage devices 12, 13, a plurality of test script file storage devices 14, a plurality of HyperCard stacks 15, an artificial intelligence inference engine 16 and a file transfer procedure 18.

Knowledgebase file storage devices 12 contain the specifications governing the subsystem programmatic interface (SPI) and a global set of commands syntax and display definitions pertinent to every type of subsystem with which the subsystem control facility (SCF) under design is intended to communicate. The background information required to generate this knowledgebase is set forth as follows in microfiche form in Appendix B "Distributed Systems Management (DSM) Programming Manual" and Appendix C "Communications Management Programming Manual", which are incorporated herein. In general, the SPI and SCF knowledgebase relate to an object-oriented distributed system in which a communications management application exchanges messages with a subsystem using the SPI. An SPI message consists of tokens: thus, to issue an SPI command, the tokens which will compose the message must be selected in such a manner as to ensure that the tokens contain the appropriate information. Once selected, the tokens must be placed in a message buffer. Similarly, to interpret an SPI response, the response tokens must be retrieved from a response buffer and examined to determine what information has been returned.

Knowledgebase file storage devices 13 contain a global set of testing conditions pertinent to at least the subsystem type or types to which the subsystem control facility under development is pertinent. This knowledgebase is attached hereto in microfiche form as Appendix D, which is hereby incorporated by reference. In general, the testing conditions embody a test generation strategy in which the common and minimal set of required techniques is generated. This set includes input validation and syntax checking, configuration, including boundary-value analysis and equivalence partitioning (i.e., identifying classes of inputs over which behavior is similar), state transitions, transactions, path, static testing by consistency verification of the requirement statements, dynamic testing of the binary table, version control, and test case—results analysis independence. In addition, the test generation strategy includes providing test script input format which is valid for use with a test SCF unit and also a coded SCF product module. The test generation strategy includes the concept of non-random test generation: viz. the same tests should be generated each time the test is run for a given subsystem; and generation of values of attributes and the sequence in which the SCF commands are generated should also be done in a non-random fashion. In addition, a cause and effect component is incorporated into the test strategy, i.e., the use of test cases investigating input condition combinations and resulting behavior. The actual testing knowledgebase includes a number of files which define all general classes, objects and properties, a utility and general rule library, and a plurality of test sets which generate specific tests, such as state/node tests (Abort, Start, Stop commands), display tests (Info, Status commands), miscellaneous tests (Boot, Load commands), attribute tests (Add, Alter, Trace commands), negative attribute tests, and other negative tests (all commands, specific, Path). The SPI tests generate negative SPI header and specific token tests, and positive combinations of specific tokens described below.

Test script file storage devices 14 are provided to store individual files of test scripts developed in the manner described below.

In the preferred embodiment, a Macintosh computer with at least eight megabytes of memory and system 6.05 or newer is used as the platform for system 10. HyperCard stacks 15 (HyperCard is a trademark of Apple Computer Company) comprise a graphical interface product available from Apple Computer Company which runs on the Macintosh computer platform. HyperCard version 2.0 or newer is preferred, and the Hypercard application memory size is preferably at least 5500 megabytes. These stacks are used as a "front end" to developmental system 10 and provide the primary interface for the user. Artificial intelligence inference engine 16 is used as the "back end" to developmental system 10 and preferably comprises Nexpert Object, an artificial intelligence inference engine available from Neuron Data. Inference engine 16 is used to generate the test scripts, and to analyze the testing results once the testing has been completed.

File transfer procedure 18 is any suitable process for transferring the test script files in storage devices 14 to the test system described below, such as the FTP file transfer procedure of Tandem Computers, Inc. In general, developmental system 10 is used to generate test scripts in the following manner. The subsystem developer (or other user) specifies via interaction with the individual screens from the HyperCard stack 15 the types of tests to be generated. The tests fall into two basic categories: those tests pertaining to the subsystem control facility knowledgebase, which cover the syntax of commands to be used in the system and the display definitions; and the subsystem programmatic interface knowledgebase, which contains information pertaining to the definition of message tokens, formatting message buffers and syntactic components of messages in general. A command is an example of a syntactic component. In the preferred embodiment, the user can select from the following menu of tests:

all the SCF tests;
all SCF tests for a specific command;
all SCF tests for a specific object;
all SCF tests for a specific command-object combination;
repetitive tests for a specific command-object combination;
SPI tests.

For the first four types of tests, the user may specify positive tests only, negative tests only, or both positive and negative tests. Positive tests provide correct input to the test system described below and test the functionality of the subsystem. Negative tests test the capability of the subsystem to handle incorrect input and to recover from such incorrect input. Once the user specifies the tests scripts to be generated in the above fashion, developmental system 10 uses the combination of the knowledgebases in storage devices 12 and 13 to generate the actual test scripts, which are stored as files in test scripts storage devices 14. The general organization of a given test file is as follows:

Header and Other Documentation where applicable:
  Test Identifier: File Name
  Command being tested
  Test Type: 0=Positive, 1=Negative, 2=Neg. Attrs, 9=SPI Neg. Hdr
  Object Type being tested
  Version of Requester being tested
  Date & Time Tests were generated
Prologue:
  Version Command
  Hierarchy Configuration & Set-up
  Consistency Snapshot: Info, Status (,Stats?)
Pre-Command(s)—Begin Discrete Scenario Loop;
Test Command
Post-Command(s)—End Discrete Scenario Loop;
Epilogue:
  Hierarchy Consistency Snapshot Verification The hierarchy configuration and set-up portion of the prologue involves setting up the test SCF system prior to exercising the particular test command, and may involve such commands as ADD, START, STATUS and INFO. The pre-command portion of the test file commences a discrete scenario loop and may involve such commands as ABORT, STATUS, START, INFO, depending upon the nature of the command to be tested. For example, if the command to be tested is the ALTER command, the pre-commands may involve the INFO, ABORT and STATUS commands. The post-command portion concerns the ending of the discrete scenario loop and essentially returns the subsystem to the original configuration. The post-command portion may involve such commands as START and STATUS, again depending upon the nature of the command undergoing testing. The epilogue portion checks to insure that the subsystem has been returned to the appropriate state.

The following is a description of the manner in which a user interacts with the various screens displayed by the HyperCard stack 15 to specify the test scripts.

Figure 2:
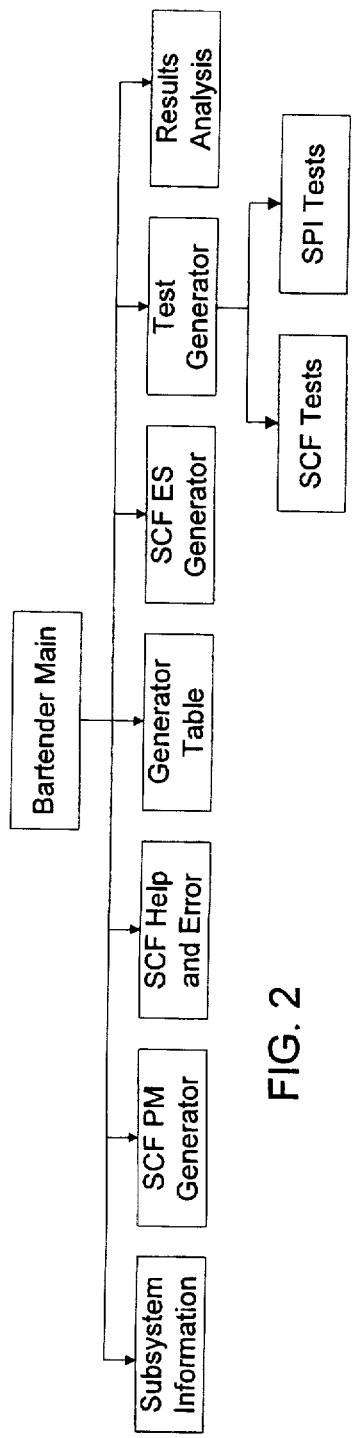
FIGS. 2, 5 and 7 are flowcharts showing the positions of the cards of FIGS. 3, 4 and 6 in the card stack.

The flowchart shown in FIG. 2 shows the position of the Test Generation stack in relation to the HyperCard stack 15, which is termed the Bartender stack in the preferred embodiment.

Figure 3:
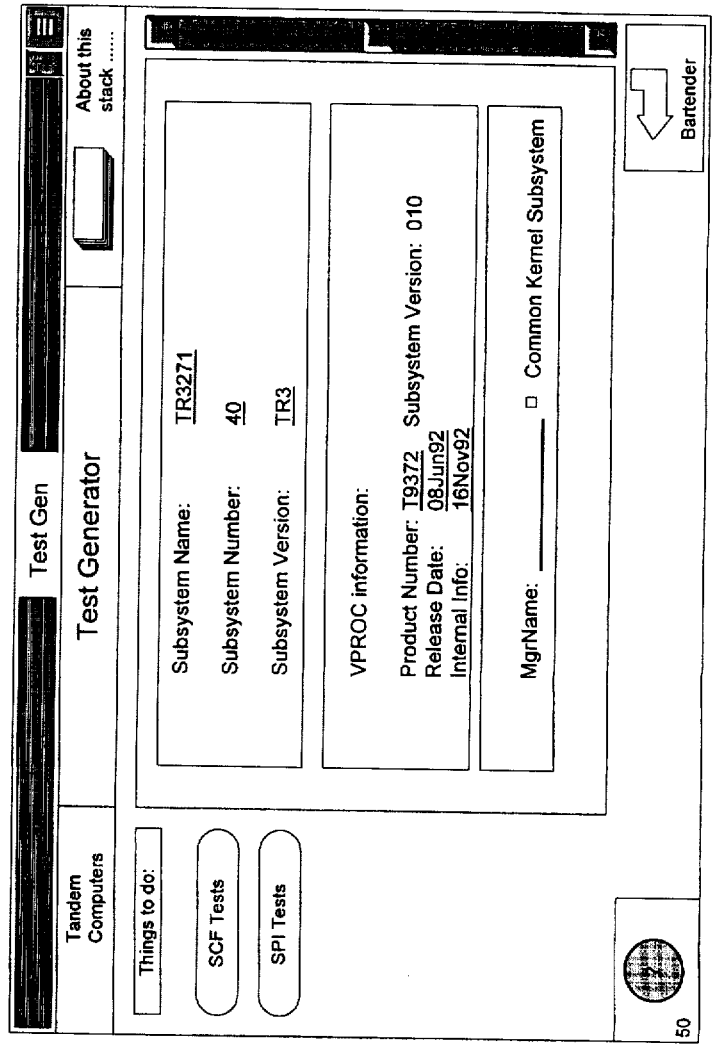
FIGS. 3, 4 and 6 illustrate test generator screen display cards.

When the Test Gen button is clicked from Bartender's main card, the card shown in FIG. 3 appears.

Click the "SCF tests" button to move to the SCF Tests card for generation of SCF tests.

Click the "SPI tests" button to move to the SPI Tests card for generation of SPI tests.

Types of Tests. The test types which can be specified are:
SCF tests for all commands and object types
SCF tests for a specific command
SCF tests for a specific object type
SCF tests for a specific command-object type pair
User specified tests for a specific command-object type pair
SPI tests for any command or object type (includes negative test header, token code and value, and positive tests combinations of MAXRESP, ALLOW-TYPE and RESPONSE-TYPE).

The naming convention for a generated SCF or SPI Test Script file is:

The first 3 characters of the selected command name forms the first 3 characters of the Test Script file name.

The character number 4 of the Test Script file name is 0 for positive tests, 1 or 2 for negative tests, 8 for user tests and 9 for SPI tests. The 2 indicates attribute specific negative testing for commands with attributes (ADD, ALTER, SWITCH, or TRACE).

The last 3 characters of the Test Script file name is the selected object type in the subsystem's object hierarchy.

The character number 8, or the last character, can be used for sequencing of similar as well as dissimilar tests with unique as well as identical data.

Since the first 3 characters of some commands are common, in these cases a compromise is made. For example, the first 3 characters of the START, STATUS, and STATS commands are the same. To distinguish between the script files belonging to these commands, use "STA" for START, "STU" for STATUS and "STS" for STATS and so on for other commands where appropriate. This practice also applies to object types.

Figure 4:
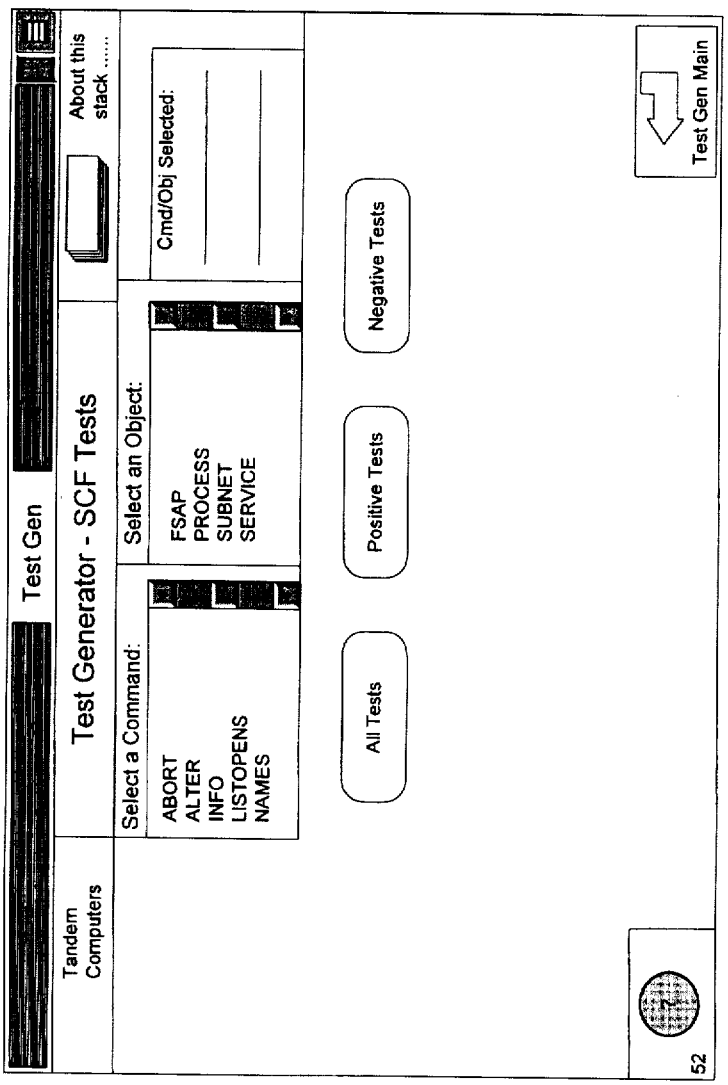
Figure 5:
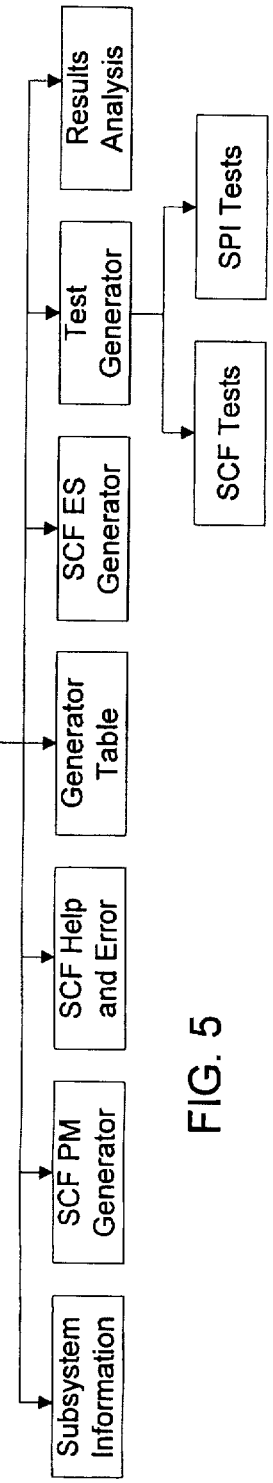

The SCF test scripts are generated in response to user selection from the SCF test card shown in FIG. 4. The flowchart in FIG. 5 shows the position of the SCF Test card in relation to the Test Generation stack. When the SCF Tests Button is clicked from the Test Generation main screen, the card shown in FIG. 4 appears.

The SCF test card is used to generate the SCF tests by selecting the buttons in this screen for a specific command, specific object type, specific command-object type pair or for the whole subsystem.

The following buttons and fields are part of the SCF Test card.

Click the "All Tests" button to generate the SCF test scripts for the entire subsystem, a command, an object type, or a command-object type pair.

Click the "Positive Tests" button to generate the SCF positive tests scripts for the entire subsystem, a command, an object type, or a command-object type pair.

Click the "Negative Tests" button to generate the SCF negative tests scripts for the entire subsystem, a command, an object type, or a command-object type pair.

Click the "Repetitive Tests" button to generate user-built SCF tests scripts to test a command-object type pair in a repetitive manner. This button appears only when both the command and object type are selected.

Use the "Select a Command" scrolling window to review the commands supported by the subsystem and the "Select an Object" scrolling window to review the supported object types. Clicking on a command from the "Select a Command" scrolling window and then clicking on one of the buttons described above causes the requested tests to be generated for the selected command. Clicking on an object type from the "Select an Object" scrolling window and then clicking on one of the buttons described above causes the requested tests to be generated for the selected object type. Clicking on both a command and an object type causes the requested tests to be generated for the selected command-object type pair. If neither a command nor an object type is selected, clicking on one of the buttons generates the requested tests for the whole subsystem. The "Cmd/Obj Selected" window displays any of the selected command and object type.

Figure 6:
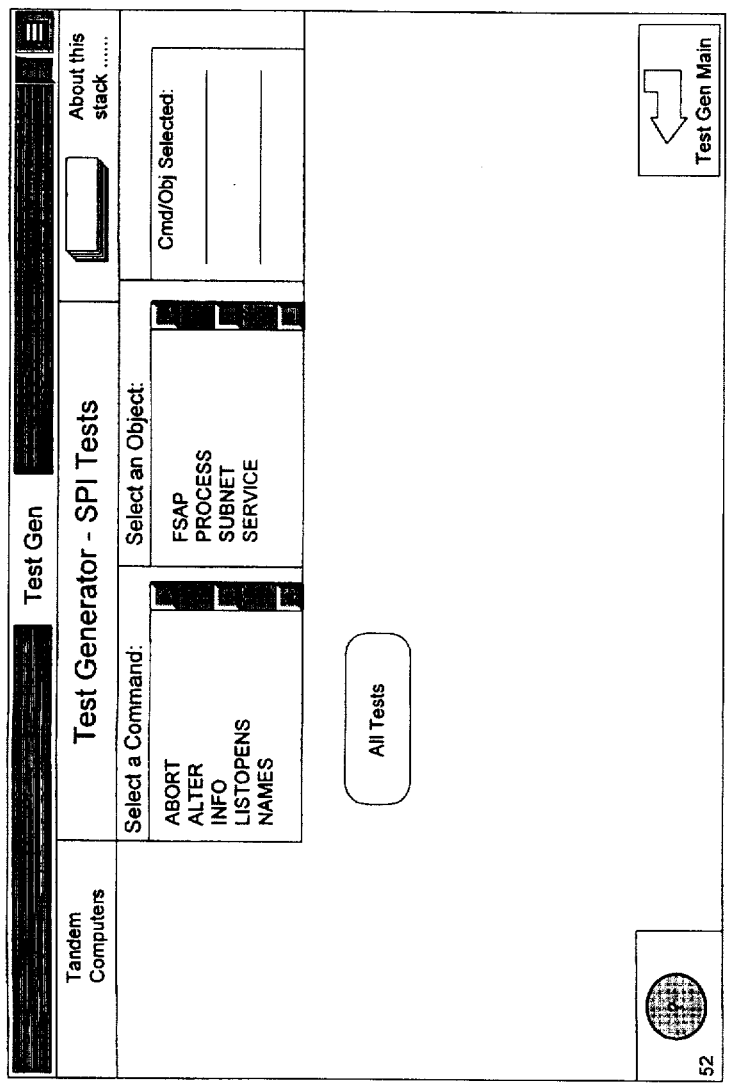
Figure 7:
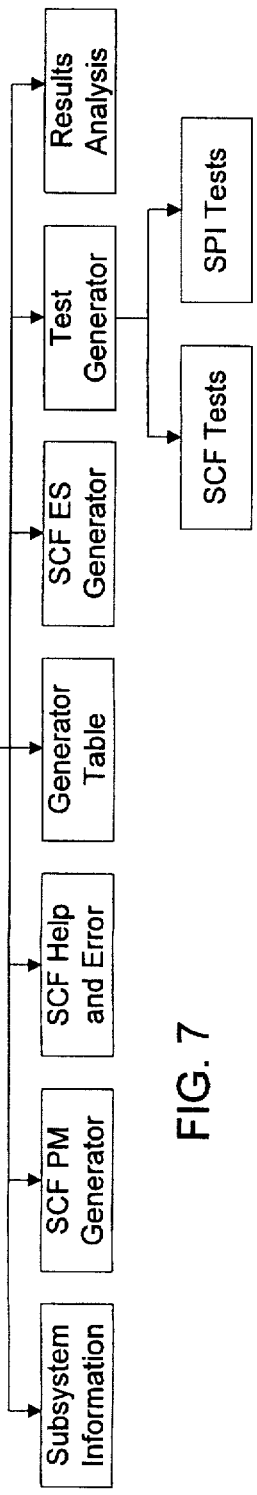

The SPI test scripts are generated with the SPI test card shown in FIG. 6. The flowchart in FIG. 7 shows the position of the SPI Test card in relation to the Test Generator stack. When the SPI Tests button is clicked from the Test Generator main screen, the card shown in FIG. 6 appears.

The SPI test card is used to generate the SPI tests by selecting the buttons in this screen for a specific command, specific object type, specific command-object pair, or for the whole subsystem.

The following buttons and fields are part of the SPI Test card.

Click the "All Tests" button to generate the SPI tests for the whole subsystem, a command, an object type or a command-object type pair.

Use the "Select a Command" scrolling window to review the commands supported by the subsystem and the "Select an Object" scrolling window to review the supported object types. Clicking on a command from the "Select a Command" scrolling window and then clicking on one of the buttons described above causes the requested tests to be generated for the selected command. Clicking on an object type from the "Select an Object" scrolling window and then clicking on one of the buttons described above causes the requested tests to be generated for the selected object type. Clicking on both a command and an object type causes the requested tests to be generated for the selected command-object type pair. If neither a command nor an object type is selected, clicking on one of the buttons generates the requested tests for the whole subsystem. The "Cmd/Obj. Selected" window displays any of the selected command and object types.

The generated test script resides in the Test Scripts folder of the subsystem's folder within the Bartender folder. The Test Scripts folder files contains version information related to the Test Scripts. Copy all files in this folder, in text format, to the testing system using the FTP file transfer procedure.

Every Test Script folder or subvolume contains only one template file. The purpose of the template file is to provide the following features (by way of example only):

Portable test scripts to systems with different addresses, process names, configuration requirements.

Adjustable test scripts for subsystem or platform sensitive data. When any of the test generator buttons are selected (for example, all tests and positive tests), the following occurs:

If a template file does not exist, then it is created

If a template file does exist, then all existing data in the Template file is purged.

For each Test Script file, the Test Generator stores one pair of templates for each object name and one pair for each object's attributes whenever the Test Generator determines that subsystem specific data is required or applicable. This permits the Tester to focus on a subsystem's sensitive data and to either configure test scripts uniquely or identically or both, as desired.

The first template component is a label and has an exact counterpart in one or more of the test script files. The second component is modified by the Tester. Everything, except the right and left angle brackets (< >), is replaced with the desired data.

Each entry in the Template file is in one of the following formats:

```
<ObjectType1 (or 2)> <??? OBJBCT NAME ???>
<TESTSETUP.Cmd0 (or 1,2,9) .Obj.ATTRIBUTE>
<??? DataType ??? >
    <Cmd0 (or 1,2,9) .Obj.ATTRIBUTE> <??? DataType
???>
```

ObjectType is one of the subsystem's object types (for example: LINE, POOL, and so on). Two objects are permitted for each object type. ??? OBJECT NAME ??? is replaced by the actual object names desired (for example: $LAN1, #su01,0, and so on). ??? DataType ??? is replaced by the actual data desired (for example: 0,48000, ETHERNET, −1, and so on). TESTSETUP is the desired configuration of the object types within the specific test.

Cmd is the first three characters of the command being tested. Obj is the first three characters of the object type being tested. For TESTSETUP this is the object type being added to the hierarchy and in some cases is not the actual one being tested. ATTRIBUTE is the actual attribute name specific to the object type being added, altered, switched, or traced.

To avoid having to recreate previously created Test Scripts simply for their template data, the following steps may be taken:

1. Make a copy or backup of the Template file prior to selecting the Test Gen button;
2. Duplicate the test scripts to a separate location after the Template file and Test Script(s) are copied to the testing system and prior to running the TACL Macro (described below). This replaces every instance where the first component matches its counterpart in the Test Script file with the data in the second component.
3. Use the same file name and the last or eighth filename position (0–9, A–Z);
4. Duplicate the relative Template file entries;
5. Modify both files with the desired unique template and data prior to running the TACL Macro.

These steps permit running the same Test Script in various configurations or with different data.

Figure 8:
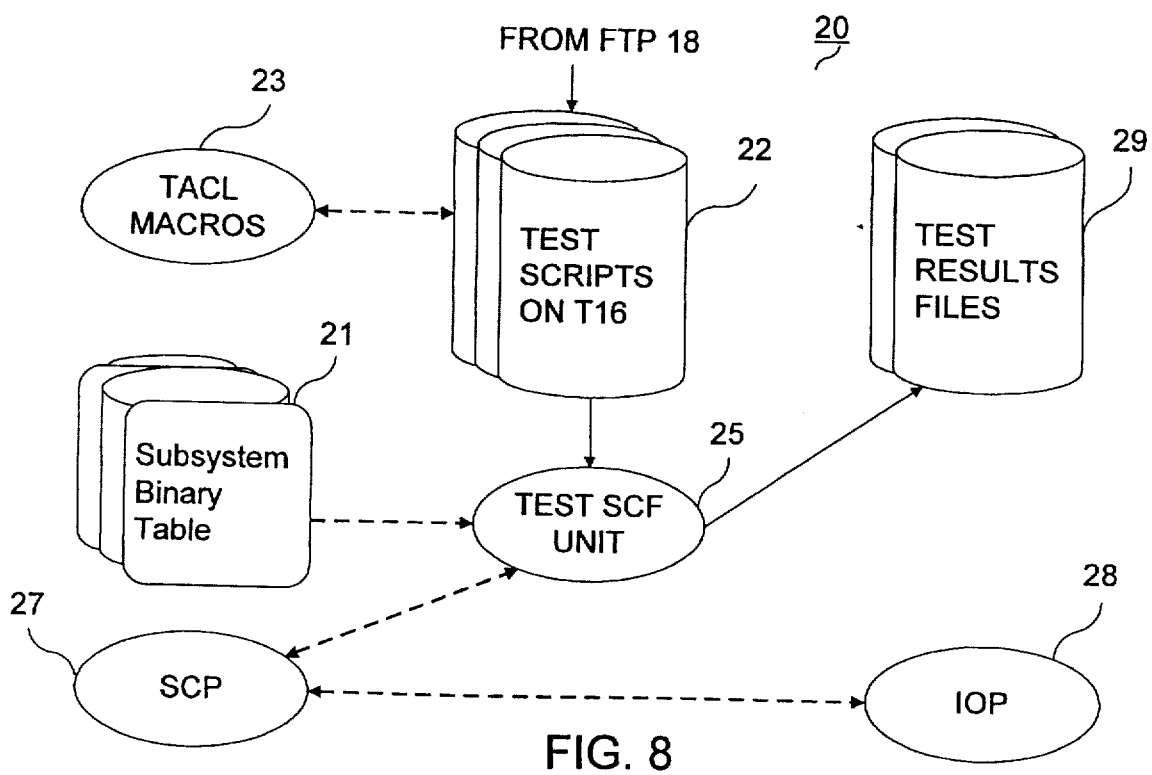
FIG. 8 is a block diagram of a knowledgebase system for exercising the test scripts and accumulating the test results.

Once the test scripts have all been generated and stored as files in the test scripts storage device 17, they are transferred to a testing system 20 illustrated in FIG. 8 using an appropriate file transfer protocol, such as the FTP procedure 18. The transferred test scripts are stored in storage devices 22 and are used to test the proposed subsystem control facility set of requirements to test the basic functionality of the SCF, the capability of the subsystem design to handle bad input and recover from it, and to test the operation of the subsystem SPI interface and conformance to the rules governing the external behavior of SPI interfaces. The set of requirements for the proposed SCF is embodied in the form of a binary table which contains the subsystem control facility command and display specifications, including commands syntax and response formats used to process subsystem control facility commands, including the formatting of the SPI buffers. In general, the binary table is generated by the developmental system 10 after the subsystem developer has provided the design information to the system 10 in an interactive manner similar to that described above with reference to the test scripts generation procedure. Basically, the user selects commands and objects to be supported by the subsystem under development in response to various cards and prompts. The resulting binary table is stored in an appropriate storage device in developmental system 10, and is then transferred to a subsystem binary table storage device 21 in the testing system 20 shown in FIG. 8. An example of a binary table is attached hereto in microfiche form as Appendix E.

As noted above, the test scripts are transferred via the FTP transfer procedure 18 to a test scripts storage device 22 in the testing system 20. If necessary, the test scripts are altered by an appropriate mapping procedure 23 termed "TACL MACROS" so that the objects defined in the test scripts are mapped to the test system in a correct manner. This is done by editing the TEMPLATE file, changing the datatype field for each object or attribute with a value that is valid for the particular system on which the tests will be executed. For instance, for a Template file defining an object of LINE and an attribute of SPEED, if the test system has a defined line for the proposed subsystem named $LHL1 and the speed of the line on this system is 9600 baud, the corresponding Template file is edited to:

<LINE><$LHL1>
<SPEED><9600>

The files created for Negative tests have default bad values defined automatically by Bartender, so there is no need to modify these values. The negative test files are updated by the TACL MACROS to target the negative tests against valid objects. After the Template file has been edited, the TACL MACROS go through every test scripts file and anywhere one of the keywords from the file TEMPLATE is found, it is changed to the correct object or attribute. When the last macro is done, the files in storage device 22 are ready for use in testing the subsystem design.

To commence testing, the subsystem binary table 21 is loaded into a test SCF unit 25, which is a generic SCF program module capable of formatting and sending command buffers to a subsystem control point 27 and receiving and decoding response buffers from subsystem control point 27. Subsystem control point 27 responds to commands from test SCF unit 25 by interacting with an Input/Output Process (IOP) 27.

Test SCF unit 25 contains additional code to generate test results in a form depending on whether the result analysis described below is to be done manually or in an automated manner.

The SPI test scripts generated by the test generator contain directives for the test SCF unit 25 in addition to the normal SCF commands text. Acting upon these directives, the test SCF unit 25 modifies the SPI buffer within unit 25 for the particular SCF command. It aids in the testing of subsystem processing of positive and negative SPI request buffers by the subsystem. Examples of the additional directives (or command modifiers) are:

HDRTYPE <Int> modifies Header Type field in the command buffer header;

MAXRESP <Int> modifies the Maximum Response field in the command buffer header;

OBJNAME A <Str> adds and modifies an Object Name token and its value;

ALLOW-TYPE D deletes the Allow Type token;

RESPONSE-TYPE <Int> adds and modifies the Response Type token value;

MANAGER TKN-BYTELEN <Int> modifies a Manager token's byte length.

The test SCF unit 25 is further described in the SPIT-COMM description attached hereto in microfiche form as Appendix F. A description of the structure and function of an SCF is set forth in microfiche form in Appendix G attached hereto entitled "Subsystem Control Facility Reference Manual". These appendices are incorporated herein.

During testing, the SCF tests and the SPI tests are conducted in a self-contained, independent manner: i.e., the execution of a given test script is independent of all other test scripts and does not depend on the execution of any other test script. In addition, the tests, where appropriate, incorporate balanced redundancy. As an example, the test script for the STOP command will contain START commands, even though the START command has an independent test script. Further, the tests are conducted for multiple objects per object type, where appropriate. The test scripts are also generated with no element of randomness: the same tests will be generated each time the test is run for a given subsystem. Similarly, the generation of values of attributes, and the sequence in which the SCF commands are generated, is also done in a non-random fashion.

The positive SCF tests are used to test the ability of the subsystem to execute correctly when provided with:

required valid modifiers and attributes only— optional modifiers and attributes are not provided;

optional modifiers and attributes in addition to the required ones;

non-conflicting modifiers and attributes.

The positive tests also test for the following:

all subsystem supported commands and objects;

different scenarios (operational profiles): i.e., different sequences of commands;

state transitions of objects;

range and boundary values for attributes.

Negative tests test for the following:

unsupported command and object;

mismatch of command and object;

missing modifiers and attributes;

non-existing modifiers and attributes;

unsupported modifiers and attributes;

duplicate modifiers and attributes;

invalid formats for object name;

invalid values for attributes;

inconsistent modifiers and attributes.

The SPI tests are intended to test the SPI interface of the subsystem, including the rules governing the external behavior of the SPI.

The positive SPI tests are used for the following specific purposes:

to cross-verify the SCF test results using the SCF tests and the test SCF unit 25;

to test for proper handling of single and multiple responses by supplying supported values (>−2) for a specific token termed the ZSPI-TKN-MAXRESP token;

to test another specific token which controls the kind of response expected from a subsystem, termed the ZSPI-TKN-RESPONSE-TYPE token, supplying supported values for this token. The supported values are ZSPI-VAL-ERR-AND-WARN, and ZSPI-VAL-ERR-WARN-AND-NORM;

to test another specific token which permits the requester to indicate under what conditions a subsystem should continue processing a request for a set of objects, termed the ZSPI-TKN-ALLOW-TYPE token, by supplying supported values for the token, the values being ZSPI-VAL-NORM-ONLY, ZSPI-VAL-WARN-AND-NORM, and ZSPI-VAL-ERR-WARN-AND-NORM;

to test mixed version compatibility, which ensures that the server (i.e., IOP 28) accepts every request defined in that version of the server and all previous versions. In addition, mixed version compatibility is also tested to ensure that there is no change in the way an old function is requested that would make the request unacceptable to any currently supported version of the server;

to test the reordering of valid token positions in the request buffer.

The negative SPI tests are used for the following specific purposes:

to test the ability of a subsystem to handle a bad message code in the SPI request buffer by using a message code < >−28;

to test various command buffer lengths, by modifying the BUFLEN and USEDLEN tokens;

to test the ability of a subsystem to handle invalid token codes and values by supplying invalid codes and values.

The following SPI header tokens and standard tokens are tested in this fashion:
ZSPI-TKN-HDRTYPE
ZSPI-TKN-SSID
ZSPI-TKN-COMMAND
ZSPI-TKN-OBJECT-TYPE
ZSPI-TKN-MAXRESP
ZSPI-TKN-MAX-FIELD-VERSION
ZSPI-TKN-SERVER-VERSION
ZSPI-TKN-ALLOW-TYPE
ZSPI-TKN-BUFLEN
ZSPI-TKN-CONTEXT
ZSPI-TKN-MANAGER
ZSPI-TKN-RESPONSE-TYPE
ZSPI-TKN-SSID
ZSPI-TKN-USEDLEN As the individual test scripts are used to test the subsystem set of requirements, the results are stored in a test results files storage device 29. The test results files contain the complete command-response buffer pair for each individual command so that the contents of a command buffer and a corresponding response buffer can be compared during the results analysis procedure described below.

With reference to FIG. 1, the test results files in storage device 29 are transferred to a corresponding storage device in development system 10 by means of the FTP procedure 18. The test results can then be analyzed by inference engine 16 using the knowledgebases in storage devices 12, 13 and the HyperCard stacks 15 provide an interface to the user in selecting which test results are to be analyzed. It should be noted that the test results in storage device 29 can be manually analyzed by the user, by providing a printout of the contents of each command and response buffer. In fact, in the preferred embodiment the SCF response format and attribute values must be manually reviewed. The SPI test results, on the other hand, are all automatically analyzed and the result is preferably printed out with comments. A sample of an analyzed results output printout is attached hereto.

As described more fully below, the user specifies by means of the HyperCard screens those types of test results for which analysis is desired. The types which can be specified by a user parallel the choices described above for the test generation process. Once the user specifies the test results to be analyzed, the system 10 uses the knowledgebases in storage devices 12, 13 and the contents of the test results files to perform the analysis.

Figure 9:
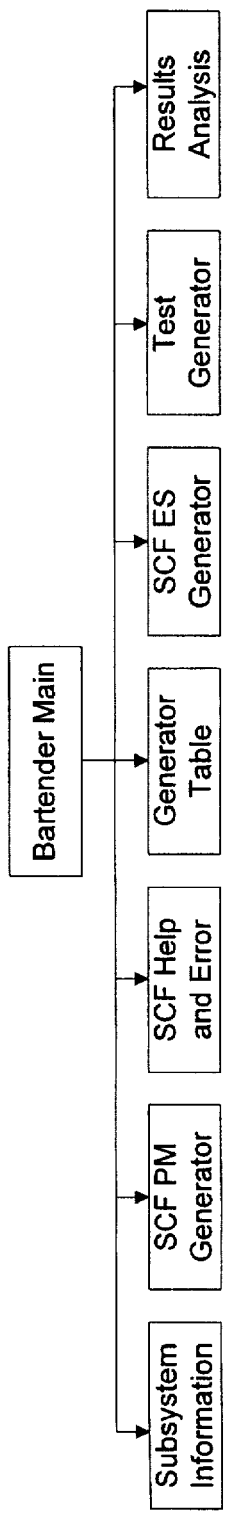
FIGS. 9, 12 and 14 are flowcharts showing the stack positions of additional cards.

The areas of analysis are as follows. All SPI requirements are verified for a subsystem's conformance. The main ones include:

Header items and data for both command and response buffers, including lengths, SSID, versions;

Cross-verify command to response buffer header items and data;

RETCODE, test generator positive or negative test specific;

DataLists-EndLists response records, including RETCODE, object type, name, state, cross-check MAXRESP token, Z- (subsystem specific token for INFO and STATUS commands);

ErrLists-EndLists response records, including RETCODE, RETCODE and error, error and SSID, object type or name;

Allow and response type processing with validation;

Additionally, token code and value verification is made and includes (but is not limited to) the following:

Mis-match between command, object type and object name
Missing token
Nonexistent object or token Not supported
Invalid format
Unsupported format (for example; wildcards)
Duplicate tokens and or values
Inconsistent (for example; modifiers, attributes)
Command-node or state behavior:
  Configuration
  Scenario (for example; sequence)
  State transition To start the test results analysis, the user clicks the "Result Analysis" button from the main Bartender card. The flowchart in FIG. 9 shows the position of the results analysis stack in relation to the Bartender tool stack.

Figure 10:
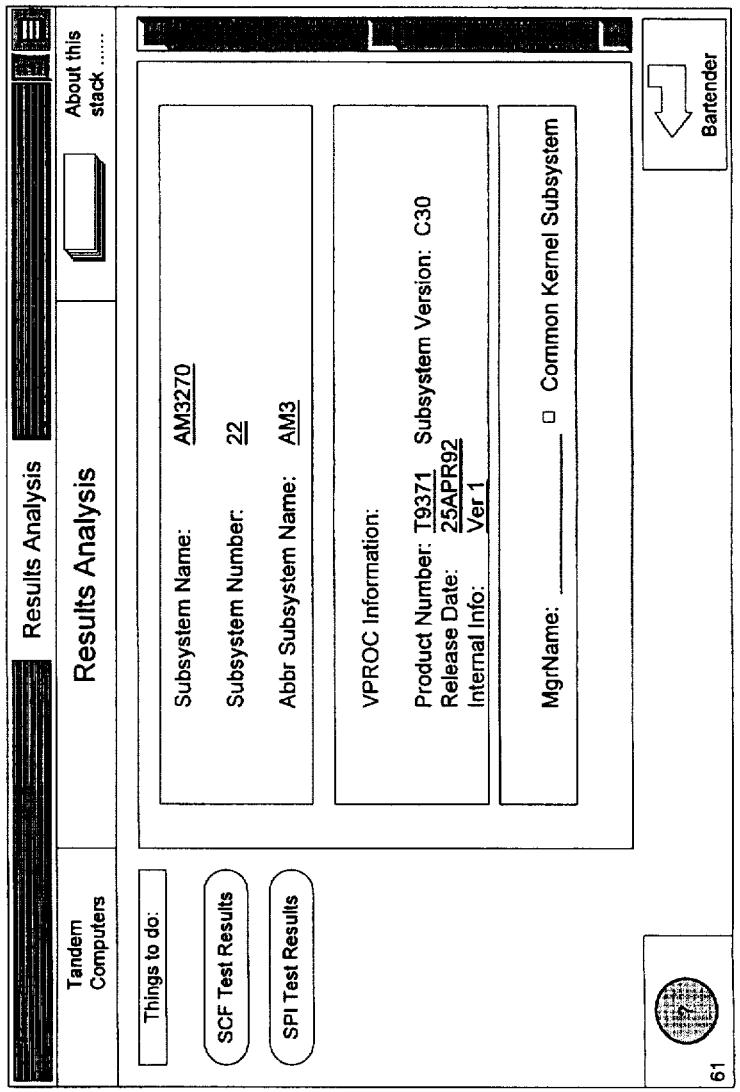
FIGS. 10, 11 and 13 illustrate results analysis screen display cards.

When the "Result Analysis" button is clicked from the main Bartender card, the card shown in FIG. 10 appears. This screen shows the name of the subsystem where the test results, the subsystem version, and other pertinent information are analyzed.

Click the "SCF Test Results" button to move to the SCF test results card for analysis of SCF test results.

Click the "SPI Test Results" button to move to the SPI test results card for analysis of SPI test results.

Types of Test Results

The types of test results that a user can analyze are:
SCF test results
SCF test results for a specific command
SCF test results for a specific object type
SCF test results for a specific command-object type pair
User test results for a specific command-object type pair
SPI test results For the first four SCF test results in the list, a user can specify the analysis of:
a) positive test results
b) negative test results
c) both types of test results Once the test results to be analyzed have been specified, the tool uses the information about the subsystem to analyze the results.

The naming convention for the SCF positive or negative Analyzed Results file is:

The first 3 characters of the selected command name forms the first 3 characters of the Analyzed Results file name.

The character number 4 of the Analyzed Results file name is 0 for positive, 1 or 2 for negative, and 9 for SPI specific Analyzed Results.

The next 3 characters of the Analyzed Results file name is the level of the selected object type in the subsystem's object hierarchy.

The remaining characters can be used for sequencing.

The first 3 characters of some commands are common, in these cases a compromise is made. For example: the first 3 characters of the START, STATUS, and STATS commands are the same. To distinguish between the script files belonging to these commands, use "STA" for START, "STU" for STATUS and "STS" for STATS and so on for other commands where appropriate. This practice also applies to object types.

Figure 12:
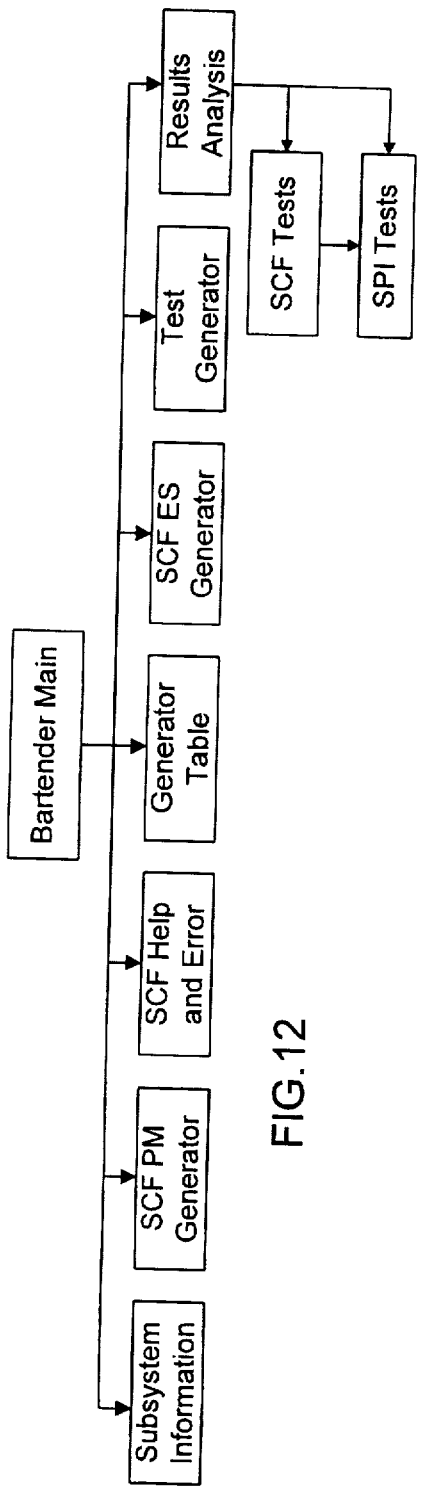
Figure 11:
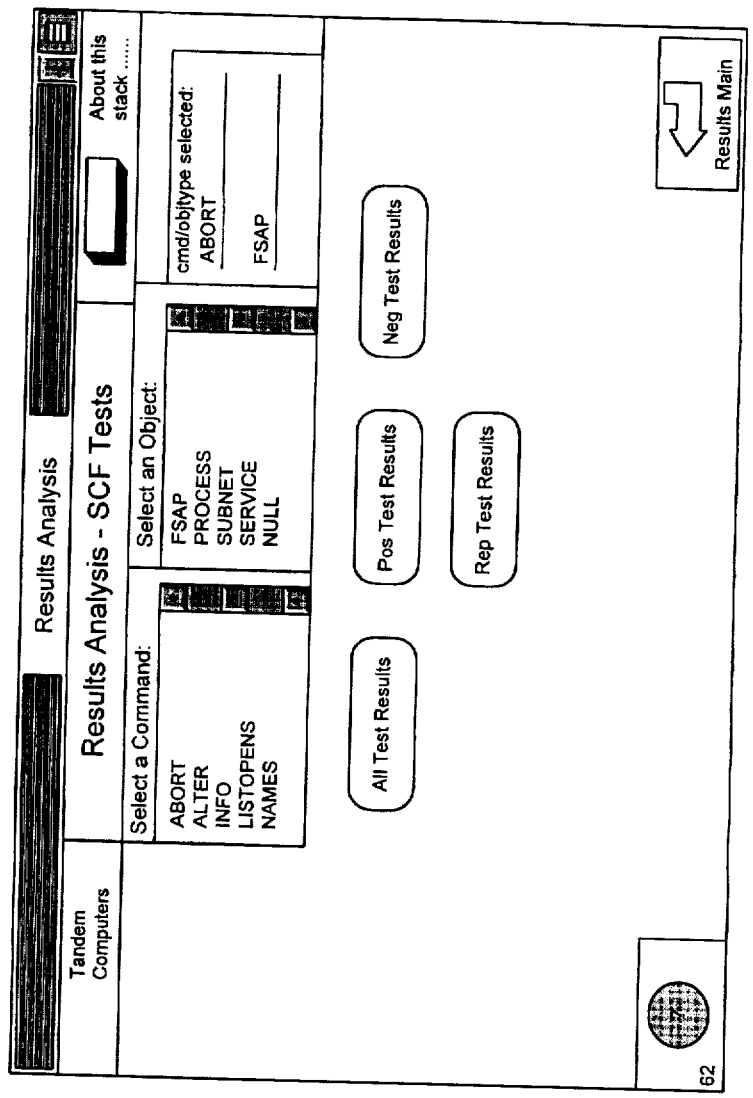

SCF test results are analyzed in the Results Analysis SCF Tests card shown in FIG. 11. The flowchart in FIG. 12 shows the position of this card in relation to the Results Analysis stack. When the "SCF Test Results" button is clicked from the Result Analysis main screen, the card shown in FIG. 11 appears.

The following buttons and fields are part of the SCF Results Analysis card.

Click the "All Test Results" button to analyze all the test results for the entire subsystem, a command, an object type or a command-object type pair.

Click the "Pos Test Results" button to analyze all the positive test results for the entire subsystem, a command, an object type or a command-object type pair.

Click the "Neg Test Results" button to analyze all the negative test results for the entire subsystem, a command, an object type or a command-object type pair.

Click the "Rep Test Results" button to analyze the test results of a command-object type pair in a repetitive manner. This button appears only when both the command-object types are selected.

Use the "Select a Command" scrolling window to review the commands supported by the subsystem and the "Select an Object" scrolling window to review the supported object types. Clicking on a command from the "Select a Command" scrolling window and then clicking on one of the buttons described above causes the requested test results analysis to be generated for the selected command. Clicking on an object type from the "Select an Object" scrolling window and then clicking on one of the buttons described above causes the requested test results analysis to be generated for the selected object type. Clicking on both a command and an object type causes the requested test results analysis to be generated for the selected command-object type pair. If neither a command nor an object type is selected, clicking on one of the buttons generates the requested test results analysis for the whole system.

The "cmd/obj type selected" window displays one of the selected command and object type.

The SCF results analysis card is used to analyze the SCF test results by selecting the buttons on the screen to analyze test results for a specific command, specific object type, specific command-object type pair or for the whole subsystem. The analysis is done by the artificial intelligence inference engine, and the analyzed test results are stored in the Analyzed Results folder within the Bartender folder. The Analyzed Results folder files contain version information related to the Analyzed Results. The results can be displayed or printed out for inspection by the user.

It is noted that the response format and the attribute values, returned by SCF in response to the inquiry commands must be manually reviewed. The rules governing the external behavior of the SPI, as reflected by the contents of each response buffer, on the other hand, are automatically analyzed.

Figure 14:
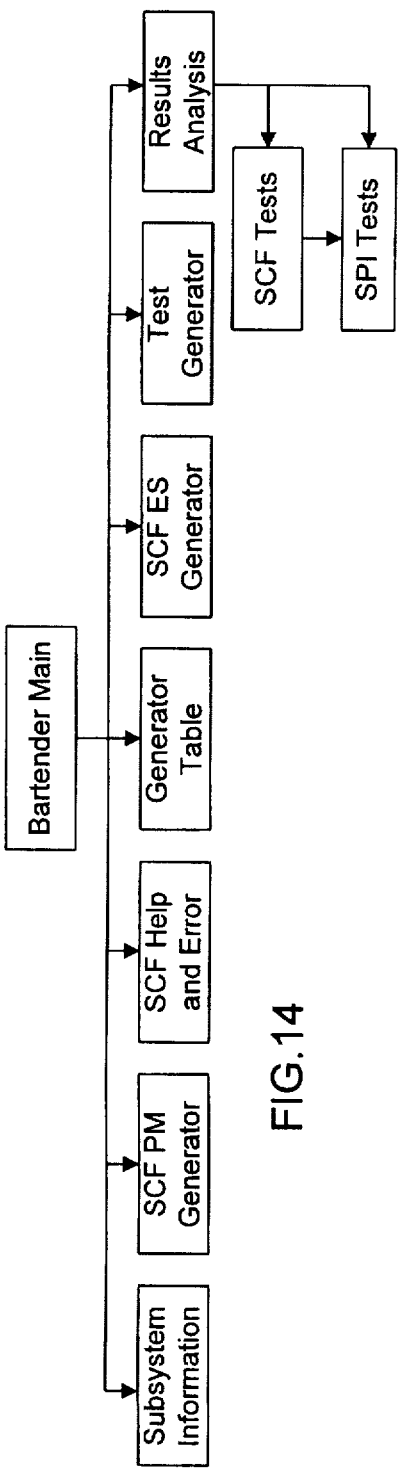
Figure 13:
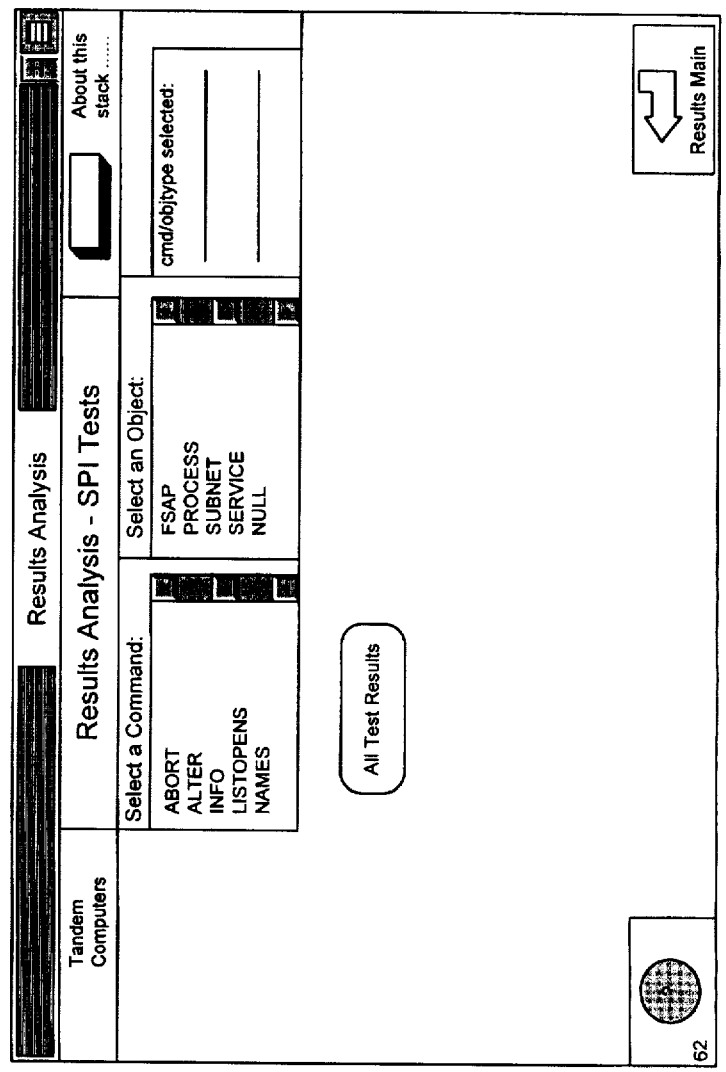
Figure 15:
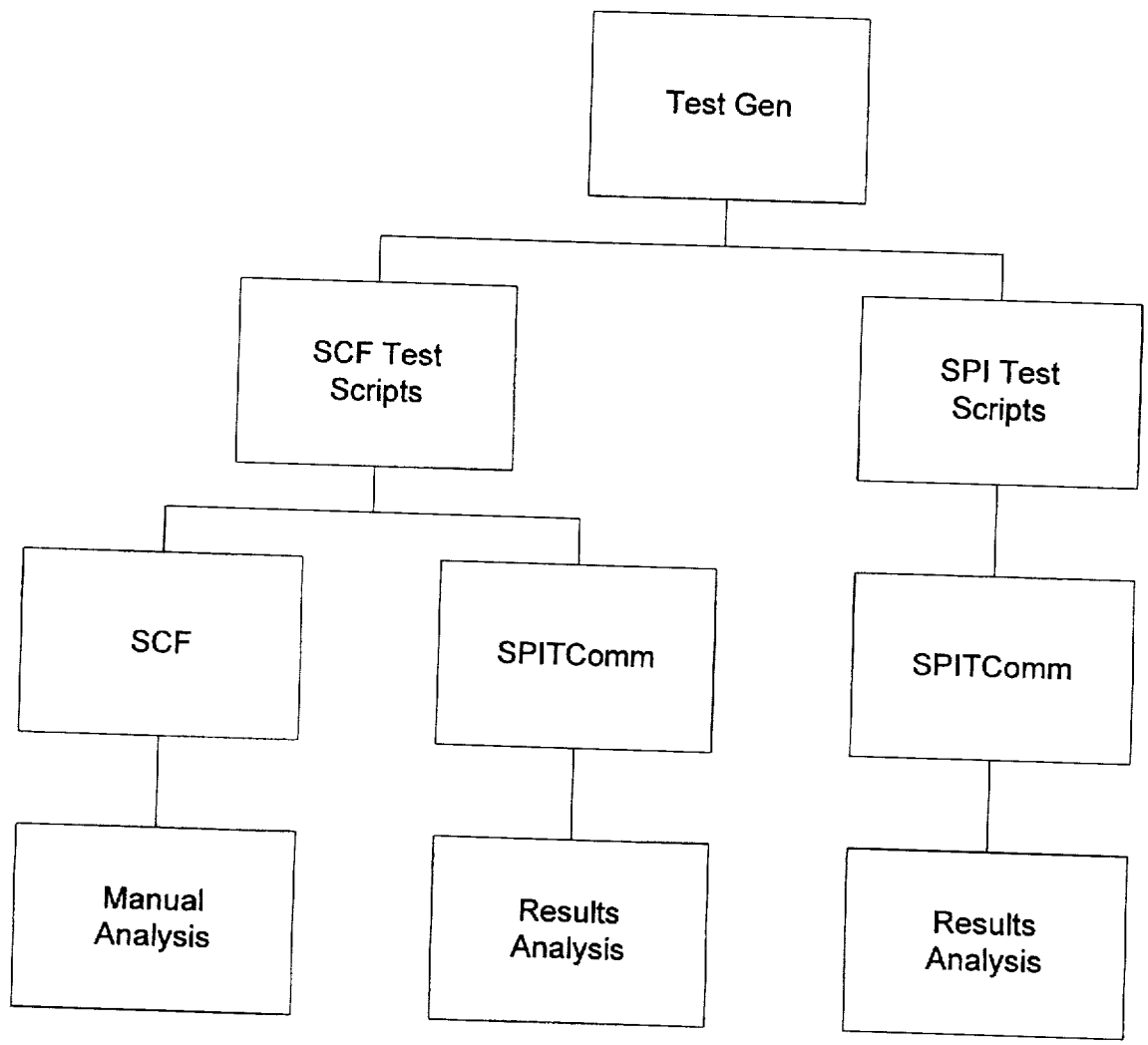
FIG. 15 illustrates the test flow process.

The SPI test results are analyzed in the "Results Analysis-SPI test" card shown in FIG. 13. The flowchart in FIG. 14 shows the position of the SPI Results Analysis card in relation to the Results Analysis Stack. When the "SPI Test Results" button is clicked from the Results Analysis main screen, the card shown in FIG. 13 appears.

The following buttons and fields are part of the SPI Results Analysis card.

Click the "All Test Results" button to analyze the SPI test results for the entire subsystem, a command, an object type or a command-object type pair.

Use the "Select a Command" scrolling window to review the commands supported by the subsystem and the "Select an Object" scrolling window to review the supported object types. Clicking on a command from the "Select a Command" scrolling window and then clicking on the All Test Results button described above causes the requested test results analysis to be generated for the selected command. Clicking on an object type from the "Select an Object" scrolling window and then clicking on "All Test Results"

button described above causes the requested test results analysis to be generated for the selected object type. Clicking on both a command and an object type causes the requested test results analysis to be generated for the selected command-object type pair. If neither a command nor an object type is selected, clicking on "All Test Results" button generates the requested test results analysis for the whole subsystem. The "cmd/obj type" window displays any of the elected command and object type.

The SPI Results Analysis Card is used to analyze the SPI test results by selecting the buttons in this screen to analyze test results for a specific command, specific object type, specific command-object type pair or for the whole subsystem. This analysis is done by inference engine 16, and the analyzed test results are stored in the Analyzed Results folder in the subsystems folder within the Bartender folder. The Analyzed Results folder files contain version information related to the Analyzed Results.

With reference to the attached Appendix H "Analyzed Results Sample," this sample illustrates the analysis of the INFO command using a line object. The contents of the command buffer are first set forth followed by the contents of the corresponding response buffer. Below these contents, is the analysis summary of the header command-response results analysis. As can be seen, there are no errors indicated and one warning: viz. the response MAXRESP is not the same as in the command buffer. Next follows the summary analysis of the SPI command-response results analysis, which indicates the command-response processing is valid. Next follows the analysis summary of the COM command-response results analysis, which indicates no warnings, and one error. This error is identified as missing the ZCOM-TKN-REQD token. The proper return code (RETCODE) is also indicated. There follows a second set of analyzed result for the same command which illustrates different errors and warnings, the manner in which the errors are identified and the reasoning why the identified item is an error, as well as the appropriate correction.

As will now be apparent, the invention provides a comprehensive and consistent testing procedure which enables the selective preparation of a suite of test scripts tailored to a specific proposed subsystem set of requirements, and which enables the developer/user to test the subsystem set of requirements without first coding the SCF. As a consequence, any requirements defects, can be addressed by the subsystem designer at an earlier stage in the process. This not only saves time in reaching the coding stage, but also substantially reduces the time required to create reliable code (since the errors are not propagated into the initial coding process). Moreover, the invention eliminates the need for manual creation of a subsystem specific test scenario by incorporating test scenarios (operational profiles) in the test generator knowledgebase to take advantage of accumulated experience from the past. Further, as the invention is applied to additional proposed subsystem control facilities, the test generator knowledgebase can expand to provide a more complete test library for future developments.

While the above provides a full and complete description of the preferred embodiment of the invention, various modifications, alternate constructions and equivalents will occur to those skilled in the art. For example, while the invention has been described with reference to a subsystem employing particular types of tokens and commands, systems employing other token arrangements may be employed, as desired. Therefore, the above should not be construed as limiting the invention, which is defined by the appended claims.

Appendix H

ANALYZED RESULTS SAMPLE

This Appendix provides an example of the Analyzed Results Output

SCF - T9082C20 - (28SEP91) (06AUG91) - 01/06/92 11:51:00 System \COMM
Copyright Tandem Computers Incorporated 1986, 1987, 1988, 1989, 1990, 1991
-> DmpCmd ON
-> DmpRsp ON
*****************************************************************
-> == Test Id   : INFO1PI
-> == Command : INFO
-> == Type    /1 : Negative
-> == Object/PI: Line
-> = *****************************************************************
-> Allow Errors                                                :
-> Version           $ZLMg, Detail

*****************************************************************
Command buffer

| | |
|---|---|
| ZSPI-TKN-HDRTYPE: | 0 |
| ZSPI-TKN-CHECKSUM: | F |
| ZSPI-TKN-COMMAND: | 0 |
| ZSPI-TKN-LASTERR: | ZSPI-ENM-OK      (0) |
| ZSPI-TKN-LASTERRCODE: | (0,0,0) |
| ZSPI-TKN-MAX-FIELD-VERSION: | 0 |
| ZSPI-TKN-MAXRESP: | -1 |
| ZSPI-TKN-OBJECT-TYPE: | 0 |
| ZSPI-TKN-SERVER-VERSION: | 0 |
| ZSIP-TKN-SSID: | TANDEM.TLAM.C00 |
| ZSPI-TKN-USEDLEN: | 122 |
| ZSPI-TKN-BUFLEN: | 5120 |
| ZSPI-TKN-BUFLENOCCURS: | 116 |
| ZSPI-TKN-MSGCODE: | -28 |
| (1,255,9990):* | "$ZLMG" |
| ZSPI-TKN-MANAGER: | $ZLMG |
| (23,8,8000): | 00:01:30.000.000 |
| ZSPI-TKN-ALLOW-TYPE:- | ZSPI-ENM-ERR-WARN-AND-NORM (7) |

*****************************************************************

*****************************************************************
Response buffer

| | |
|---|---|
| ZSPI-TKN-HDRTYPE: | 0 |
| ZSPI-TKN-CHECKSUM: | F |

Analyzed Results Sample

```
        ZSPI-TKN-COMMAND:        0
        ZSPI-TKN-LASTERR:        ZSPI-ENM-OK (0)
        ZSPI-TKN-LASTERRCODE:    (0,0,0)
        ZSPI-TKN-MAX-FIELD-VERSION:
                                 0
        ZSPI-TKN-MAXRESP:        0
        ZSPI-TKN-OBJECT-TYPE:    0
        ZSPI-TKN-SERVER-VERSION: C20
        ZSPI-TKN-SSID:           TANDEM.TLAM.C20
        ZSPI-TKN-USEDLEN:        204
        ZSPI-TKN-BUFLEN:         5120
        ZSIP-TKN-BUFLENOCCURS:   198
        ZSPI-TKN-MSGCODE:        -28
        ZSPI-TKN-COUNTOFDATALISTS: 1

ZSPI-TKN-DATALIST:*
        ZSPI-TKN-SERVER-BANNER:  "MLMAN      (T9379C20 04OCT91 26SEP91)    "
                                 "    "
        ZCMK-TKN-PKG-BANNER:     "COM-KRNL   (T6562C20 10Sep91 s31AAQ)     "
                                 "    "
        (1,255,9990):            "\COMM.$ZLMG"
        (11,2,9988):             17
        ZSPI-TKN-RETCODE:        0
        ZSPI-TKN-ENDLIST:-
```
*************************************************************************
WARNING: Response MAXRESP is not same as in Command.
TOTAL Header ERRORS: 0.
TOTAL Header WARNINGS:1
******** End of Header Cmd-Rsp Results Analysis
*************************************************************************
VALID ZSPI Command-Response Processing.
TOTAL ZSPI ERRORS: 0
TOTAL ZSPI WARNINGS: 0
********End of ZSPI Cmd-Rsp Results Analysis
*************************************************************************
ERROR: Missing ZCOM-TKN-REQID; RETCODE must be ZCOM-ERR-TKN-REQ.
TOTAL ZCOM ERRORS:1
TOTAL ZCOM WARNINGS: 0.
******** End of ZCOM Cmd-Rsp Results Analysis
*************************************************************************
-> ==
-> INFO Line $LAM8, ReqId -1, USEDLEN 8

*************************************************************************
Command buffer

ZSPI-TKN-HDRTYPE:        0

Analyzed Results Sample

| | |
|---|---|
| ZSPI-TKN-CHECKSUM: | F |
| ZSPI-TKN-COMMAND: | 3 |
| ZSPI-TKN-LASTERR: | ZSPI-ENM-OK (0) |
| ZSPI-TKN-LASTERRCODE: | (0,0,0) |
| ZSPI-TKN-MAX-FIELD-VERSION: | C00 |
| ZSPI-TKN-MAXRESP: | -1 |
| ZSPI-TKN-OBJECT-TYPE: | 13 |
| ZSPI-TKN-SERVER-VERSION: | 0 |
| ZSPI-TKN-SSID: | TANDEM.TLAM.C00 |
| ZSPI-TKN-USEDLEN: | 7 |
| SZPI-TKN-BUFLENOCCURS: | 132 |
| ZSPI-TKN-BUFLEN: | 5120 |
| ZSPI-TKN-MSGCODE: | -28 |
| (1,255,9990):* | "$:LAM8" |
| ZSPI-TKN-MANAGER: | $ZLMG |
| (23,8,8000): | 00:01:30.000.000 |
| ZSPI-TKN-ALLOW-TYPE: | ZSPI-ENM-ERR-WARN-AND-NORM (7) |
| (7,255,8001):- | 36 83 80 73 84 67 7 157 255 255 |

****************************************************************************************

****************************************************************************************

Response buffer

| | |
|---|---|
| ZSPI-TKN-HDRTYPE: | 0 |
| ZSPI-TKN-CHECKSUM: | F |
| ZSPI-TKN-COMMAND: | -1 |
| ZSPI-TKN-LASTERR: | ZSPI-ENM-OK (0) |
| ZSPI-TKN-LASTERRCODE: | (0,0,0) |
| ZSPI-TKN-MAX-FIELD-VERSION: | 0 |
| ZSPI-TKN-MAXRESP: | -1 |
| ZSPI-TKN-OBJECT-TYPE: | 0 |
| ZSPI-TKN-SERVER-VERSION: | C20 |
| ZSPI-TKN-SSID: | TANDEM.SCP.C20 |
| ZSPI-TKN-USEDLEN: | 126 |
| ZSPI-TKN-BUFLENOCCURS: | 120 |
| ZSPI-TKN-BUFLEN: | 5120 |
| ZSPI-TKN-MSGCODE: | -28 |
| ZSPI-TKN-COUNTOFDATALISTS: | 1 |
| ZCOM-TKN-OBJTYPE:* | 17 |
| ZSPI-TKN-DATALIST: | |
| ZSPI-TKN-RETCODE: | -29 |
| ZSPI-TKN-ERRLIST: | |

Analyzed Results Sample

| | |
|---|---|
| ZSPI-TKN-OBJTYPE: | 17 |
| ZSPI-TKN-ERROR: | |
| | Z-SSID TANDEM.SCP.C20 |
| | Z-ERROR 29 |
| ZSPI-TKN-PARM-ERR: | |
| | Z-TOKENCODE (25,32,-243) ZSPI-TKN-MANAGER |
| | Z-INDEX 1 |
| | Z-OFFSET 0 |
| ZSPI-TKN-ENDLIST: | |
| ZSPI-TKN-ENDLIST:- | |
| ZSPI-TKN-DATALIST: | |
| ZSPI-TKN-RETCOD: | -29 |
| ZSPI-TKN-ERRLIST: | |
| ZCOM-TKN-OBJTYPE: | 17 |
| ZCOM-TKN-ERROR: | |
| | Z-SSID TANDEM.SCP.C20 |
| | Z-ERROR    -29 |
| ZSPI-TKN-PARM-ERR: | |
| | Z-TOKENCODE (25,32,-243) ZSPI-TKN-MANAGER |
| | Z-INDEX 1 |
| | Z-OFFSET 0 |
| ZSPI-TKN-ENDLIST: | |
| ZSPI-TKN-ENDLIST:- | |

****************************************************************************************

ERROR: USEDLEN not = (OCCURS + 6); File System Err 2 with NO Reply Buffer is required.
ERROR: Command-Response Header COMMAND not same; RETCODE must be ZCOM-ERR-CMD-NOT-SUPP.
WARNING: Command Header MAX-FIELD-VERSION exceeds Response.
WARNING: Command-Response Header SSID NUMBER not same.
WARNING: Command-Response Header OBJTYPE should be same.
TOTAL Header ERRORS:2
TOTAL Header WARNINGS:3
******* End of Header Cmd-Rsp Results Analysis
****************************************************************

ERROR: Response Record with DATALIST RETCODE <> 0 must have an ERRLIST ERROR with same value.
ERROR: Response COUNTofDATALISTS must = Number of DataLists.
TOTAL ZSPI ERRORS:2
TOTAL ZSPI WARNINGS: 0.
******* End of ZSPI Cmd-Rsp Results Analysis
****************************************************************

VALID ZCOM Command-Response Processing.
TOTAL ZCOM ERRORS:0
TOTAL ZCOM WARNINGS: 0.
******* End of ZCOM Cmd-Rsp Results Analysis
****************************************************************

Analyzed Results Sample

Analyze Script Processing Complete
Total Errors   : 5
Total Warnings: 4

What is claimed is:

1. A method of testing and analyzing the conformance of a proposed set of requirements for a proposed subsystem control facility for a distributed systems network, said method comprising the steps of:

(a) providing a knowledgebase containing a predetermined set of subsystem requirements;

(b) preparing a proposed set of requirements for a proposed subsystem control facility expressed in binary table form;

(c) providing a suite of test scripts for testing the proposed set of requirements against the predetermined set of subsystem requirements, said test scripts implementing positive tests for testing the ability of the proposed subsystem control facility set of requirements to process valid commands and objects and negative tests for testing the ability of said proposed set of requirements to process invalid commands or objects;

(d) applying the binary table and the suite of test scripts to a test subsystem control facility to generate test results; and (e) analyzing the test results using the predetermined set of subsystem requirements to measure the conformance of the proposed set of requirements to the predetermined set of subsystem requirements.

2. The method of claim 1, wherein said step (e) of analyzing includes the step of reporting any failure to conform with the positive tests or the negative tests.

3. The method of claim 1 wherein said predetermined set of subsystem requirements includes rules governing the operation of a subject network and a library of permitted commands and objects; said proposed set of requirements includes paired selections of commands and objects from said library; and wherein said step (e) of analyzing includes the steps of comparing the test results obtained using said paired selections of commands and objects with the rules and specifying violations thereof.

4. The method of claim 3 wherein said library includes object modifiers and attributes; said proposed set of requirements includes selected modifiers and attributes paired to objects; and wherein said step (e) of analyzing includes the steps of comparing the test results obtained using said selected modifiers and attributes paired to objects with the rules and specifying violations of the rules.

5. The method of claim 1 wherein said step (e) of analyzing includes the step of specifying the nature of any nonconformance.

6. The method of claim 5 wherein said step of specifying includes the step of indicating the correction required to establish conformance.

7. The method of claim 5 wherein said step of specifying includes the step of relating the nonconformance to said predetermined set of subsystem requirements.

8. A method of testing and analyzing the conformance of a proposed set of requirements for a proposed subsystem control facility for a distributed systems network, said method comprising the steps of:

(a) providing a first knowledgebase containing a predetermined set of subsystem requirements;

(b) preparing a proposed set of requirements for a proposed subsystem control facility expressed in binary table form;

(c) providing a suite of test scripts for testing the proposed set of requirements against the predetermined set of subsystem requirements, said step of providing a suite of test scripts including the steps of providing a second knowledgebase containing set generation information relating to those commands and objects specific to the proposed subsystem control facility set of requirements, providing a user interface permitting selection of types of tests and specific commands and objects to be tested, and using the first and second knowledgebases to generate the suite of test scripts;

(d) applying the binary table and the suite of test scripts to a test subsystem control facility to generate test results; and (e) analyzing the test results using the predetermined set of subsystem requirements to measure the conformance of the proposed set of requirements to the predetermined set of subsystem requirements.

9. The method of claim 8 wherein said step of providing a second knowledgebase includes the step of furnishing test generation information including a common and minimal set of test techniques to be applied to the proposed subsystem control facility set of requirements.

10. The method of claim 9 wherein said common and minimal set of test techniques includes positive tests for testing the ability of the proposed subsystem control facility set of requirements to process valid commands and objects and negative tests for testing the ability of said proposed set of requirements to process invalid commands or objects.

11. A method of testing and analyzing the conformance of a proposed set of requirements for a proposed subsystem control facility for a distributed systems network, said method comprising the steps of:

(a) providing a knowledgebase containing a predetermined set of subsystem requirements, said step of providing a knowledgebase including the step of furnishing a global set of object types, object names, permitted object attributes and permitted object values;

(b) preparing a proposed set of requirements for a proposed subsystem control facility expressed in binary table form;

(c) providing a suite of test scripts for testing the proposed set of requirements against the predetermined set of subsystem requirements;

(d) applying the binary table and the suite of test scripts to a test subsystem control facility to generate test results; and (e) analyzing the test results using the predetermined set of subsystem requirements to measure the conformance of the proposed set of requirements to the predetermined set of subsystem requirements.

12. A method of testing and analyzing the conformance of a proposed set of requirements for a proposed subsystem control facility for a distributed systems network, said method comprising the steps of:

(a) providing a knowledgebase containing a predetermined set of subsystem requirements;

(b) preparing a proposed set of requirements for a proposed subsystem control facility expressed in binary table form;

(c) providing a suite of test scripts for testing the proposed set of requirements against the predetermined set of subsystem requirements, said step of providing a suite of test scripts including the step of generating a plurality of test scripts files and corresponding template files;

(d) applying the binary table and the suite of test scripts to a test subsystem control facility to generate test results; and (e) analyzing the test results using the predetermined set of subsystem requirements to measure the conformance of the proposed set of requirements to the predetermined set of subsystem requirements.

13. A system for testing and analyzing the conformance of a proposed set of requirements for a proposed subsystem control facility for a distributed systems network, said system comprising:

means for providing a knowledgebase containing a predetermined set of subsystem requirements;

means for preparing a proposed set of requirements for a proposed subsystem control facility expressed in binary table form;

means for providing a suite of test scripts for testing the proposed set of requirements against the predetermined set of subsystem requirements, said test scripts implementing positive tests for testing the ability of the proposed subsystem control facility set of requirements to process valid commands and objects and negative tests for testing the ability of said proposed set of requirements to process invalid commands or objects;

means for applying the binary table and the suite of test scripts to a test subsystem control facility to generate test results; and means for analyzing the test results using the predetermined set of subsystem requirements to measure the conformance of the proposed set of requirements to the predetermined set of subsystem requirements.

14. The system claim 13, wherein said means for analyzing includes means for reporting any failure to conform with the positive tests or the negative tests.

15. The system of claim 13 wherein said predetermined set of subsystem requirements includes rules governing the operation of a subject network and a library of permitted commands and objects; said proposed set of requirements includes paired selections of commands and objects from said library; and wherein said means for analyzing includes means for comparing the test results obtained using said paired selections of commands and objects with the rules and specifying violations thereof.

16. The system of claim 15 wherein said library includes object modifiers and attributes; said proposed set of requirements includes selected modifiers and attributes paired to objects; and wherein said means for analyzing includes means for comparing the test results obtained using said selected modifiers and attributes paired to objects with the rules and specifying violations of the rules.

17. The system of claim 13 wherein said means for analyzing includes means for specifying the nature of any nonconformance.

18. The system of claim 17 wherein said means for specifying includes means for indicating the correction required to establish conformance.

19. The system of claim 17 wherein said means for specifying includes means for relating the nonconformance to said predetermined set of subsystem requirements.

20. A system for testing and analyzing the conformance of a proposed set of requirements for a proposed subsystem control facility for a distributed systems network, said system comprising:

means for providing a first knowledgebase containing a predetermined set of subsystem requirements;

means for preparing a proposed set of requirements for a proposed subsystem control facility expressed in binary table form;

means for providing a suite of test scripts for testing the proposed set of requirements against the predetermined set of subsystem requirements, said means for providing a suite of test scripts including means for providing a second knowledgebase containing test generation information relating to those commands and objects specific to the proposed subsystem control facility set of requirements, means for providing a user interface permitting selection of types of tests and specific commands and objects to be tested, and means for using the first and second knowledgebases to generate the suite of test scripts;

means for applying the binary table and the suite of test scripts to a test subsystem control facility to generate test results; and means for analyzing the test results using the predetermined set of subsystem requirements to measure the conformance of the proposed set of requirements to the predetermined set of subsystem requirements.

21. The system of claim 20 wherein said means for providing a second knowledgebase includes means for furnishing test generation information including a common and minimal set of test techniques to be applied to the proposed subsystem control facility set of requirements.

22. The system of claim 21 wherein said common and minimal set of test techniques includes positive tests for testing the ability of the proposed subsystem control facility set of requirements to process valid commands and objects and negative tests for testing the ability of said set of requirements to process invalid commands or objects.

23. A system for testing and analyzing the conformance of a proposed set of requirements for a proposed subsystem control facility for a distributed systems network, said system comprising:

means for providing a knowledgebase containing a predetermined set of subsystem requirements, said means for providing a knowledgebase including means for furnishing a global set of object types, object names, permitted object attributes and permitted object values;

means for preparing a proposed set of requirements for a proposed subsystem control facility expressed in binary table form;

means for providing a suite of test scripts for testing the proposed set of requirements against the predetermined set of subsystem requirements;

means for applying the binary table and the suite of test scripts to a test subsystem control facility to generate test results; and means for analyzing the test results using the predetermined set of subsystem requirements to measure the conformance of the proposed set of requirements to the predetermined set of subsystem requirements.

24. A system for testing and analyzing the conformance of a proposed set of requirements for a proposed subsystem control facility for a distributed systems network, said system comprising:

means for providing a knowledgebase containing a predetermined set of subsystem requirements;

means for preparing a proposed set of requirements for a proposed subsystem control facility expressed in binary table form;

means for providing a suite of test scripts for testing the proposed set of requirements against the predetermined set of subsystem requirements, said means for providing a suite of test scripts including means for generating a plurality of test scripts files and corresponding template files;

means for applying the binary table and the suite of test scripts to a test subsystem control facility to generate test results; and means for analyzing the test result using the predetermined set of subsystem requirements to measure the conformance of the proposed set of requirements to the predetermined set of subsystem requirements.

25. A computer program product comprising:

a computer usable medium having computer readable code embodied therein for testing and analyzing the conformance of a proposed set of requirements for a proposed subsystem control facility for a distributed system network, the computer program product comprising:

computer readable program code devices configured to cause a computer to effect providing a suite of test scripts for testing a proposed set of requirements for a proposed subsystem control facility expressed in binary table form against a predetermined set of subsystem requirements from a knowledgebase, said test scripts implementing positive tests for testing the ability of the proposed subsystem control facility set of requirements to process valid commands and objects and negative tests for testing the ability of said proposed set of requirements to process invalid commands or objects;

computer readable program code devices configured to cause a computer to effect applying the binary table and the suite of test scripts to a test subsystem control facility to generate test results; and computer readable program code devices configured to cause a computer to effect analyzing the test results using the predetermined set of subsystem requirements to measure the conformance of the proposed set of requirements to the predetermined set of subsystem requirements.

* * * * *